United States Patent
Yao et al.

(10) Patent No.: US 9,054,592 B2
(45) Date of Patent: Jun. 9, 2015

(54) SYNCHRONOUS RECTIFYING CONTROL METHOD AND CIRCUIT FOR ISOLATED SWITCHING POWER SUPPLY

(71) Applicant: Silergy Semiconductor Technology (Hangzhou) LTD, Hangzhou, ZheJiang Province (CN)

(72) Inventors: Jie Yao, ZheJiang Province (CN); Chen Zhao, ZheJiang Province (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 115 days.

(21) Appl. No.: 13/967,254

(22) Filed: Aug. 14, 2013

(65) Prior Publication Data

US 2014/0078788 A1    Mar. 20, 2014

(30) Foreign Application Priority Data

Sep. 20, 2012  (CN) .......................... 2012 1 0353150

(51) Int. Cl.
H02M 3/335    (2006.01)

(52) U.S. Cl.
CPC ........ *H02M 3/33523* (2013.01); *Y02B 70/1475* (2013.01); *H02M 3/33592* (2013.01)

(58) Field of Classification Search
CPC ....................................................... H02M 1/32
USPC ............ 363/21.06, 21.13, 21.14, 49, 89, 127; 323/222–225, 271–275, 280–288
See application file for complete search history.

(56) References Cited

U.S. PATENT DOCUMENTS

| | | | |
|---|---|---|---|
| 5,717,578 A * | 2/1998 | Afzal | 320/111 |
| 6,388,906 B1 * | 5/2002 | Ferstenberg | 363/86 |
| 8,416,587 B2 * | 4/2013 | Chen | 363/21.14 |
| 2005/0231181 A1 * | 10/2005 | Bernacchia et al. | 323/274 |
| 2007/0002595 A1 * | 1/2007 | Tzeng | 363/49 |
| 2009/0058387 A1 * | 3/2009 | Huynh et al. | 323/282 |
| 2009/0091304 A1 * | 4/2009 | Yang | 323/242 |
| 2009/0108820 A1 * | 4/2009 | Mirea | 323/271 |
| 2009/0213623 A1 * | 8/2009 | Yang | 363/49 |
| 2009/0268494 A1 * | 10/2009 | Hu | 363/89 |
| 2011/0032732 A1 * | 2/2011 | Hsu | 363/21.14 |
| 2011/0044076 A1 * | 2/2011 | Zhang et al. | 363/21.17 |
| 2011/0080104 A1 * | 4/2011 | Gray et al. | 315/246 |
| 2011/0110127 A1 * | 5/2011 | Lee | 363/44 |
| 2012/0008352 A1 * | 1/2012 | Huang et al. | 363/95 |
| 2012/0020123 A1 * | 1/2012 | Hsu | 363/21.14 |
| 2012/0038331 A1 * | 2/2012 | Wu et al. | 323/235 |

(Continued)

*Primary Examiner* — Fred E Finch, III
*Assistant Examiner* — Yusef Ahmed
(74) *Attorney, Agent, or Firm* — Michael C. Stephens, Jr.

(57) ABSTRACT

Disclosed are synchronous rectifying control methods and circuits for an isolated switching power supply. In one embodiment, a method can include: (i) generating a ramp voltage based on a power terminal voltage, where the power terminal voltage includes a voltage between first and second power terminals of a synchronous rectifier in the isolated switching power supply; (ii) determining whether the power terminal voltage starts declining; (iii) comparing the ramp voltage to a threshold voltage when the power terminal voltage starts to decline, where the threshold voltage substantially matches a minimum conduction time of the synchronous rectifier; (iv) reducing the ramp voltage and controlling the synchronous rectifier in an off state when the ramp voltage is lower than the threshold voltage; and (v) reducing the ramp voltage and controlling the synchronous rectifier in on state when the ramp voltage is higher than the threshold voltage.

12 Claims, 6 Drawing Sheets

(56) References Cited

U.S. PATENT DOCUMENTS

| | | | |
|---|---|---|---|
| 2012/0195076 A1* | 8/2012 | Zhang et al. | 363/21.12 |
| 2012/0229034 A1* | 9/2012 | Yu et al. | 315/186 |
| 2012/0300520 A1* | 11/2012 | Ren et al. | 363/127 |
| 2013/0051083 A1* | 2/2013 | Zhao | 363/17 |
| 2013/0093406 A1* | 4/2013 | Cheng | 323/283 |
| 2013/0194836 A1* | 8/2013 | Morris et al. | 363/21.14 |
| 2013/0301309 A1* | 11/2013 | Chen | 363/21.12 |
| 2014/0003096 A1* | 1/2014 | Deng | 363/21.14 |
| 2014/0029315 A1* | 1/2014 | Zhang et al. | 363/21.13 |

* cited by examiner

US 9,054,592 B2

SYNCHRONOUS RECTIFYING CONTROL METHOD AND CIRCUIT FOR ISOLATED SWITCHING POWER SUPPLY

RELATED APPLICATIONS

This application claims the benefit of Chinese Patent Application No. 201210353150.1, filed on Sep. 20, 2012, which is incorporated herein by reference in its entirety.

FIELD OF THE INVENTION

The present invention relates to the field of semiconductor technology, and specifically to synchronous rectifying control methods and circuits for a synchronous rectifier in a switching power supply using a power transformer.

BACKGROUND

A typical isolated power supply can include one or more primary-side switches, at least one transformer, and one or more secondary-side rectifiers. The transformer can be used to provide a relatively large voltage conversion ratio, and more reliable short circuit protection for an input source, as well as to realize isolation between the primary and secondary sides for satisfy purposes. The rectifier can be used to rectify an AC voltage or current of the transformer's secondary-side winding to generate a DC voltage or current for an output load.

SUMMARY

In one embodiment, a synchronous rectifying control method for an isolated switching power supply, can include: (i) generating a ramp voltage based on a power terminal voltage, where the power terminal voltage includes a voltage between first and second power terminals of a synchronous rectifier in the isolated switching power supply; (ii) determining whether the power terminal voltage starts declining, where the ramp voltage continues to rise when the power terminal voltage is rising; (iii) comparing the ramp voltage to a threshold voltage when the power terminal voltage starts to decline, where the threshold voltage substantially matches a minimum conduction time of the synchronous rectifier; (iv) reducing the ramp voltage and controlling the synchronous rectifier in an off state when the ramp voltage is lower than the threshold voltage; and (v) reducing the ramp voltage and controlling the synchronous rectifier in on state when the ramp voltage is higher than the threshold voltage.

In one embodiment, a synchronous rectifying control circuit configured for an isolated switching power supply, can include: (i) a voltage determiner configured to receive a power terminal voltage, where the power terminal voltage comprises a voltage between first and second power terminals of a synchronous rectifier in the isolated switching power supply, where the voltage determine is configured to activate a drop signal when the power terminal voltage starts to decline; (ii) a ramp voltage generator configured to generate a ramp voltage that continuously rises according to the power terminal voltage when the drop signal is inactive, where the ramp voltage generator is configured to reduce the ramp voltage in response to the drop signal being activated; and (iii) a conduction signal generator configured to receive the ramp voltage, the drop signal, and a threshold voltage, where the threshold voltage substantially matches a minimum conduction time of the synchronous rectifier, and where the conduction signal generator is configured to generate a conduction signal to turn on the synchronous rectifier when the ramp voltage is higher than the threshold voltage and the drop signal is activated.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In order to reduce conduction losses of a synchronous rectifier, a metal oxide semiconductor (MOS) transistor with a relatively low on-resistance can be used as the synchronous rectifier. By using the MOS transistor with a low on-resistance $R_{DSON}$, a conduction voltage drop of the rectifier can be reduced to be less than, e.g., about 0.1V. In this way, the power conversion efficiency can be significantly improved.

Figure 1A:
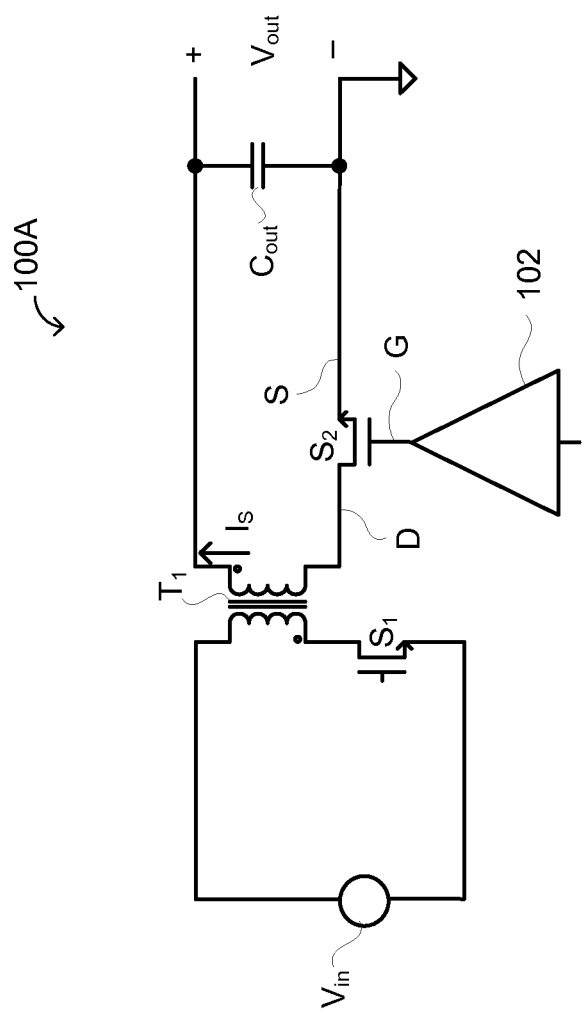
FIG. 1A is a schematic block diagram of a flyback converter.

Referring to FIG. 1A, shown is a schematic block diagram 100A of an example flyback switching power supply. A flyback converter may be a step-up/down circuit converter with a transformer formed by an induction coil, to achieve isolation and voltage ratio conversion. A flyback converter can be used in both AC/DC and DC/DC conversion with galvanic isolation between the input and any outputs. More precisely, the flyback converter is a buck-boost converter with the inductor split to form a transformer, such that the voltage ratios are multiplied with an additional advantage of isolation. In this particular embodiment, NMOS transistor $S_2$ can be used as a synchronous rectifier having electrode drain D connected to the secondary-side winding of transformer $T_1$, and a source S connected to ground. Control circuit 102 can be used to drive and control gate G.

During operation, primary-side transistor $S_1$ and synchronous rectifier $S_2$ may turn on and off periodically to adjust output voltage $V_{out}$ or output current, so as to output a substantially constant voltage or current. When primary-side transistor $S_1$ is turned off, synchronous rectifier $S_2$ positioned at the secondary-side of transformer T1 can be turned on. When secondary-side winding current $I_S$ almost drops to 0 mA or primary-side transistor $S_1$ is turned on again, synchronous rectifier $S_2$ can be turned off.

Under ideal conditions, turning on or off the synchronous rectifier can be determined by the drain current or drain-source voltage. For example, if an N-type MOS transistor is used as synchronous rectifier $S_2$, when the drain-source voltage goes negative or current begins to flow from source to drain, the MOS transistor can be turned on. When the drain-source voltage is positive or current begins to flow from the drain to source, the MOS transistor can be turned off. However, under some conditions, it may be difficult to accurately control the conduction (on) and shutdown (off) time.

For example, the comparator used to detect the zero-crossing point of voltage or current may have input offset or speed limitation problems. As another example, an inherent delay may exist from the output of the comparator to the output of the driver, and from the voltage variation at the gate of the MOS transistor to the actual conduction/shutdown of the MOS transistor. Also, parasitic inductance and capacitance may be found in the MOS transistor package and/or on the printed circuit board (PCB) that may cause detection signal distortion.

Figure 1B:
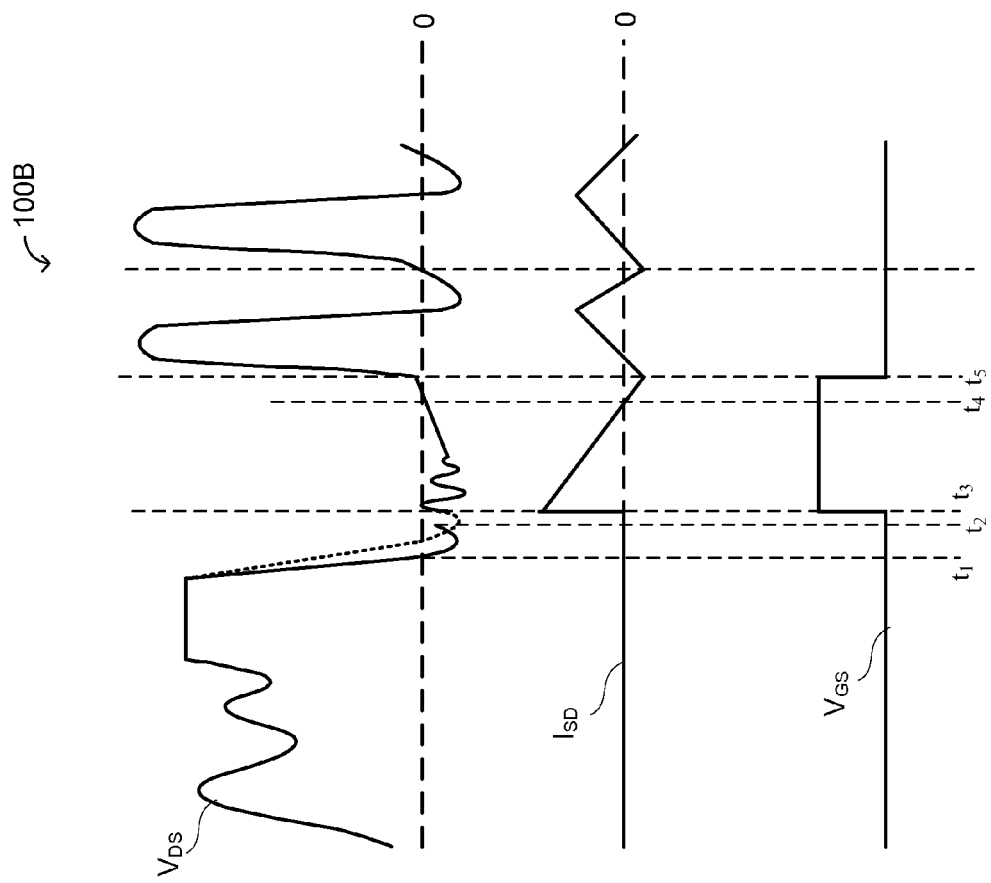
FIG. 1B is a waveform diagram of an example operation of a synchronous rectifier in the flyback converter of FIG. 1A.

Referring to FIG. 1B, shown is an operating waveform diagram 100B of synchronous rectifier $S_2$ in the flyback switching power supply in FIG. 1A. Because of inherent delay of the circuit structure, synchronous rectifier $S_2$ may be turned on with a delay time, as shown in FIG. 1B from time $t_1$ to time $t_2$. In some applications, an RC filter circuit may be utilized to filter drain-source voltage $V_{DS}$, and then to determine when to turn on synchronous rectifier $S_2$ by detecting drain-source voltage $V_{DS}$. However, by using this detection method, the RC filter circuit may have an inherent delay which may further delay the conduction time of synchronous rectifier $S_2$.

With reference to the dotted waveform in the top diagram portion of FIG. 1B, the conduction time of synchronous rectifier $S_2$ can be delayed from time $t_1$ to time $t_3$, resulting power loss increase. In addition, after primary-side transistor $S_1$ is turned off, drain-source voltage $V_{DS}$ of synchronous rectifier $S_2$ may rapidly decline rapidly, and then oscillate. In order to avoid frequently turning the synchronous rectifier on and off during the oscillation interval, a minimum conduction time may be set to shield the oscillation interval. This can avoid timing chaos, and may maintain regulation of the load at $V_{out}$ in the light load condition, in order to ensure normal operation of the synchronous rectifier.

However, because of the minimum conduction time, under light load conditions, the conduction time of primary-side transistor $S_1$ can be relatively short, and the peak value of the primary-side current can be relatively small. Therefore, the secondary-side current may drop to zero within the minimum conduction time (e.g., at time $t_4$), and then the secondary-side current may continue to decline from zero during the remaining conduction time until the minimum conduction time is over (e.g., at time $t_5$). The negative current may cause significant variation of drain-source voltage $V_{DS}$ of synchronous rectifier $S_2$, and it may take a relatively long time for the synchronous rectifier to return to a stable state.

In particular embodiments, the secondary-side synchronous rectifier may timely turn on after the main power switch at the primary-side of the isolated switching power is turned off (e.g., at the moment when the voltage between the first and second power terminals of synchronous rectifier begins to decline). This can reduce the interval between a shutdown time of the main power device and the conduction time of the synchronous rectifier as much as possible, and may also to reduce power losses in order to obtain maximum working efficiency. In addition, in light load conditions, a synchronous rectifier control circuit and/or method of particular embodiments can ensure that the synchronous rectifier may not be turned on during the minimum conduction time of the synchronous rectifier. This can avoid negative current, and also improve the operating efficiency and system stability.

In one embodiment, a synchronous rectifying control method for an isolated switching power supply, can include: (i) generating a ramp voltage based on a power terminal voltage, where the power terminal voltage includes a voltage between first and second power terminals of a synchronous rectifier in the isolated switching power supply; (ii) determining whether the power terminal voltage starts declining, where the ramp voltage continues to rise when the power terminal voltage is rising; (iii) comparing the ramp voltage to a threshold voltage when the power terminal voltage starts to decline, where the threshold voltage substantially matches a minimum conduction time of the synchronous rectifier; (iv) reducing the ramp voltage and controlling the synchronous rectifier in an off state when the ramp voltage is lower than the threshold voltage; and (v) reducing the ramp voltage and controlling the synchronous rectifier in on state when the ramp voltage is higher than the threshold voltage.

Figure 2:
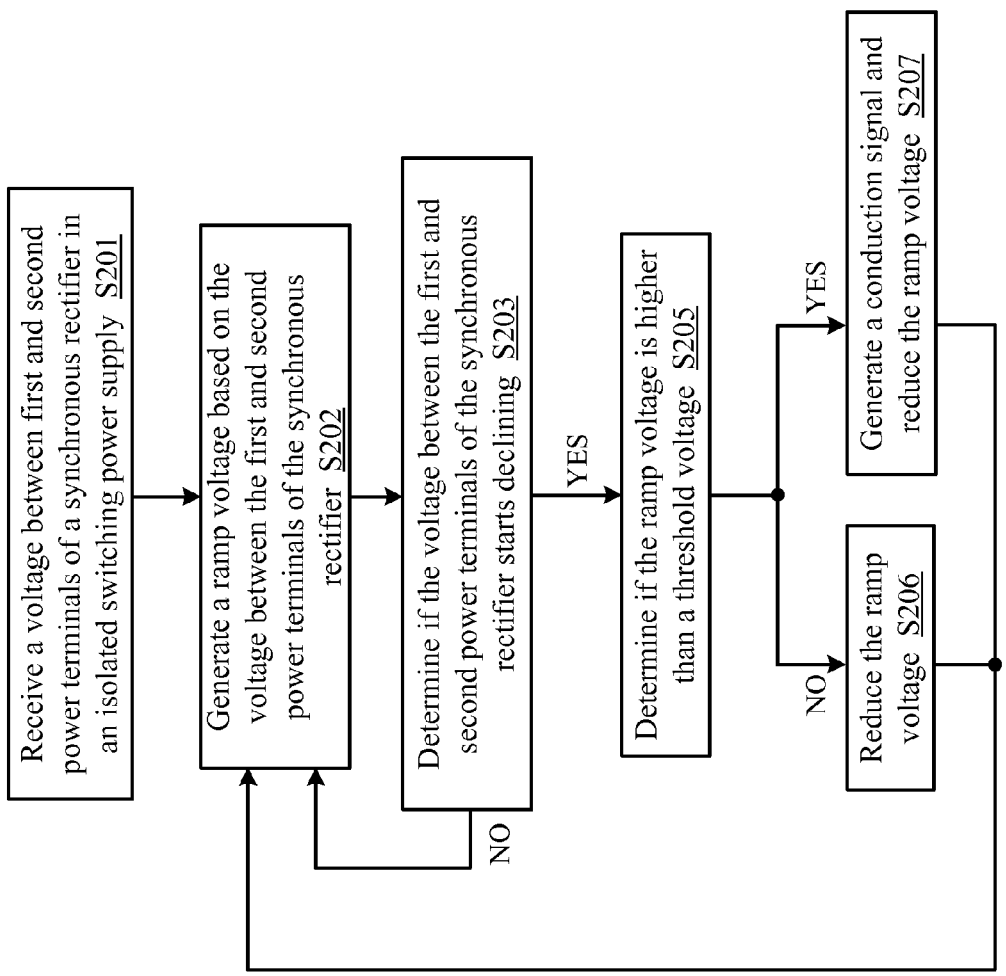
FIG. 2 is a flow diagram of an example synchronous rectifying control method in accordance with embodiments of the present invention.

Referring now to FIG. 2, shown is a flow diagram of a synchronous rectifying control method for an isolated switching power supply, in accordance with embodiments of the present invention. At S201, a power terminal voltage can be received. The power terminal voltage can include a voltage between first and second power terminals of a synchronous rectifier in the isolated switching power supply. At S202, a ramp voltage can be generated according to the power terminal voltage.

At S203, a variation trend of the power terminal voltage can be monitored, and a determination can be made as to whether power terminal voltage starts to decline. At S204, when the power terminal voltage is rising, S202 can be repeated, and the ramp voltage may continue to rise. At S205, when the power terminal voltage starts to decline, a determination can be made as to whether the ramp voltage is higher than a threshold voltage. For example, the threshold voltage may substantially match a minimum conduction time of the synchronous rectifier.

At S206, when the ramp voltage is less than the threshold voltage, the ramp voltage can be reduced, and the synchronous rectifier can be controlled to be in an off state. At S207, when the ramp voltage is higher than the threshold voltage, the ramp voltage may be reduced, and the synchronous rectifier can be controlled in an on state. After the synchronous rectifier is turned on for a predetermined time, the synchronous rectifier can be turned off, and S201 to S207 may be repeated as necessary. This can control accurately turning on and off of the synchronous rectifier, to obtain a relatively high operating efficiency.

In FIG. 2, the shutdown time of the primary-side power device in the isolated switching power supply can be accurately judged or determined by monitoring the power terminal voltage. The secondary-side synchronous rectifier can be timely turn on after the primary-side power device is turned off. This can reduce an interval between shutdown or a turn off time of the main power device and the conduction time of the synchronous rectifier as much as possible. In this way, power losses can be reduced, and operating efficiency can be maximized or improved.

In addition, by comparing the ramp voltage that can represent a conduction time of the primary-side power device, and a threshold voltage that can represent a minimum conduction time of synchronous rectifier, the synchronous rectifier can be kept in the off state during the minimum conduction time. In this way, potential negative current can be avoided, and operating efficiency and system stability can be improved.

For example, the ramp voltage can be generated by generating a charging current corresponding to the power terminal voltage, and using the charging current to charge a capacitor. The voltage across the capacitor may be configured as the ramp voltage. In addition, when the power terminal voltage is detected as declining, a single pulse signal with a fixed time can be generated. The single pulse signal (e.g., a "drop" signal) can be used to control discharge of the capacitor. As a result, the ramp voltage may rapidly drop to zero.

In one example, the charging current can be in direct proportion to the power terminal voltage. In another example, the charging current can be in direct proportion to a difference between the power terminal voltage and an output voltage of the isolated switching power supply. In this case, the threshold voltage can be in direct proportion to the output voltage of the isolated switching power supply and the minimum conduction time of the synchronous rectifier, and in inverse proportion to the capacitance value of the capacitor.

Monitoring or determining the variation (e.g., decreasing or increasing) trend of the power terminal voltage can include sampling and holding the power terminal voltage. When the power terminal voltage as obtained by the holding is higher than the power terminal voltage as obtained by sampling, the power terminal voltage may be detected as declining or decreasing.

In particular embodiments, the synchronous rectifier can be any suitable type of power devices (e.g., an N-type MOS [NMOS] transistor, a P-type MOS [PMOS] transistor, a bipolar junction transistor [BJT], etc.). When the synchronous rectifier is an NMOS transistor, the first power terminal can be the drain of the NMOS transistor, the second power terminal can be the source of the NMOS transistor, and the control terminal can be the gate of the NMOS transistor. The voltage between the first and second power terminals of the synchronous rectifier (the power terminal voltage) can be the drain-source voltage of the NMOS transistor. Also, the synchronous rectifying control method of particular embodiments can be used in any synchronous rectifier of an isolated switching power supply based on the transformer. In the examples herein, the synchronous rectifier is taken as an NMOS transistor, and the isolated switching power supply is taken as a flyback switching power supply.

Figure 3:
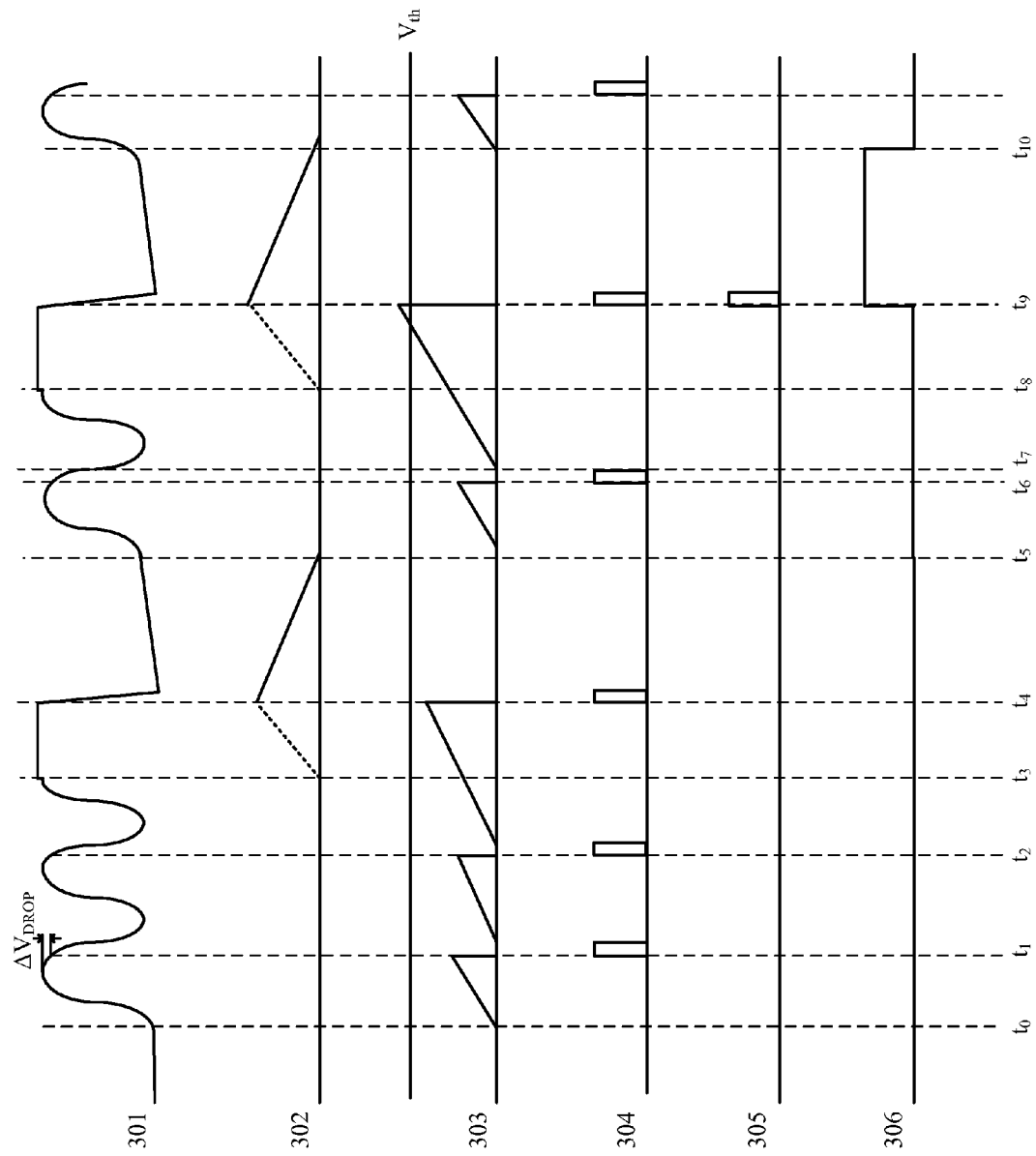
FIG. 3 is a waveform diagram of an example operation of the synchronous rectifying control method of FIG. 2.

Referring now to FIG. 3, shown is a waveform diagram of an example operation the synchronous rectifying control method for the isolated switching power supply in FIG. 2. Waveform 301 can represent drain-source voltage $V_{DS}$ of the synchronous rectifier. The solid part of waveform 302 can represent inductor current $i_S$ at the secondary-side winding of the isolated switching power supply. The corresponding dotted part of waveform 302 can represent the inductor current at the primary-side winding. Waveform 303 can represent ramp voltage $V_{ramp}$. Waveform 304 can represent single pulse signal $V_{pulse}$ or drop signal $S_{drop}$. Waveform 305 can represent conduction signal $S_{on}$ of the synchronous rectifier. Waveform 306 can represent control signal $V_{ctrl}$ of the synchronous rectifier.

As shown in waveform 301, when both the synchronous rectifier and the primary-side power device are off, the inductor of the primary-side winding of the isolated switching power supply and the output capacitor of the primary-side power device may resonate. Thus, the drain-source voltage of the synchronous rectifier may resemble a sine wave. Therefore, during the resonance interval, the drain-source voltage may repeatedly decline, such as at times $t_1$, $t_2$, $t_4$, $t_6$ and $t_9$. In order to obtain a relatively high operating efficiency, the synchronous rectifier at the secondary-side may be turned on at once after the primary power device is turned off (e.g., at times $t_4$ and $t_9$).

In particular embodiments, the conduction time of the synchronous rectifier can be accurately obtained by detecting the power terminal voltage, to avoid possible inadvertent conduction of the synchronous rectifier. After the synchronous rectifier is turned off, ramp voltage $V_{ramp}$ can be generated according to drain-source voltage $V_{DS}$ of the synchronous rectifier. A variation trend of drain-source voltage $V_{DS}$ can be monitored, and ramp voltage $V_{ramp}$ can be compared against threshold voltage $V_{th}$. For example, threshold voltage $V_{th}$ can be set or predetermined according to a minimum conduction time of the synchronous rectifier.

Because the time interval of the sine wave in the resonant stage (e.g., from time $t_0$ to $t_2$, or from time $t_5$ to time $t_6$) can be relatively short, and the average value of drain-source voltage $V_{ds}$ during this time interval is relatively small, a peak value of ramp voltage $V_{ramp}$ can be relatively small and may not reach threshold voltage $V_{th}$. On the contrary, after the resonant stage, the conduction time interval of the main power transistor can be, e.g., from time $t_3$ to $t_4$. Since the time interval (e.g., from time $t_2$ to $t_4$) is relatively longer than the interval of the sine wave in the resonant stage, and the average value of drain-source voltage $V_{DS}$ in this interval is relatively high, the peak value of ramp voltage $V_{ramp}$ may reach threshold voltage $V_{th}$ in a relatively short time after the drain-source voltage begins to decline. At this moment, conduction signal $S_{on}$ (shown as waveform 305) maybe generated to turn on the synchronous rectifier, and to rapidly reduce ramp voltage $V_{ramp}$ to zero.

For example, the ramp voltage can be obtained by charging a capacitor. Specifically, a proportional charging current can be generated according to drain-source voltage $V_{DS}$, and the charging current can be utilized to charge the capacitor. In the rising time interval of drain-source voltage $V_{DS}$, the voltage across the capacitor may continue to rise from zero, and the voltage across the capacitor can be configured as ramp voltage $V_{ramp}$. At the moment where drain-source voltage $V_{DS}$ begins to decline, a single pulse or drop signal (shown as waveform 304) can be generated, and this single pulse signal can be used to control the capacitor to discharge. In this way, ramp voltage $V_{ramp}$ may rapidly drop to zero.

After a certain conduction time, the synchronous rectifier can be turned off. The shutdown or turnoff control signal for the synchronous rectifier can be obtained by any appropriate shutdown signal control method. For example, when the drain-source voltage reaches a predetermined negative value, the synchronous rectifier can be turned off. In this particular example, in the time interval from time $t_3$ to time $t_4$, the primary-side power device is turned on, and the inductor current of the primary-side winding can continue to rise. In the time interval from time $t_4$ and time $t_5$, the synchronous rectifier may be turned on, and the current of the secondary-side winding can decline from the maximum value (see, e.g., waveform 302).

For example, threshold voltage $V_{th}$ can be set according to the particular topology structure of the isolated switching power supply, and the capacitance value of the capacitor. In a flyback topology structure:

$$N \times I_P = N \times \frac{V_{in}}{L_P} \times T_{ON\_P} = I_S = \frac{V_{out}}{L_S} \times T_{ON\_S} \quad (1)$$

In formula (1), N can represent a turn ratio of the primary-side winding and secondary-side winding of the flyback switching power supply, $I_P$ can represent the peak current at the primary-side winding, $V_{in}$ can represent the input voltage of the flyback switching power supply, $L_P$ can represent the inductance value of the primary-side winding, $T_{ON\_P}$ can represent the conduction time of the primary-side power device at the primary-side of the transformer, $I_S$ can represent the peak current of the secondary-side winding, $V_{out}$ can represent the output voltage of the flyback switching power supply, $L_S$ can represent the inductance value of the secondary-side winding, and $T_{ON\_S}$ can represent the conduction time of the synchronous rectifier at the secondary-side of the transformer.

The following can be deduced from formula (1):

$$T_{ON\_P} = \frac{V_{out}}{V_{in}} \times \frac{L_P}{L_S} \times \frac{1}{N} \times T_{ON\_S} = \frac{V_{out}}{V_{in}} \times N \times T_{ON\_S} \quad (2)$$

As the ratio of inductance value $L_P$ of the primary-side winding and the inductance value $L_S$ of the secondary-side winding is the square of turn ratio N (i.e., $N^2$), the relationship in formula (2) can be obtained.

Correspondingly, the following formula (3) can be deduced from formula (2):

$$V_{out} \times T_{ON\_S} = \frac{V_{in}}{N} \times T_{ON\_P} \quad (3)$$

The relationship between drain-source voltage $V_{DS}$, input voltage $V_{in}$, and output voltage $V_{out}$ of the synchronous rectifier can be shown as formula (4):

$$V_{DS} = \frac{V_{in}}{N} + V_{out} \quad (4)$$

By taking formula (4) into formula (3), formula (5) can be obtained:

$$V_{out} \times T_{ON\_S} = (V_{DS} - V_{out}) \times T_{ON\_P} \quad (5)$$

Replacing $(V_{DS}-V_{out})$ by a charging current, formula (5) can be converted to formula (6):

$$V_{out} \times T_{ON\_S} = k \times I_{CHG} \times T_{ON\_P} \quad (6)$$

Here, k is a proportionality coefficient, and $I_{CHG}$ can represent the charging current. In the conduction time of the primary-side power device, the charging current can be used to charge a capacitor to generate a ramp voltage. A value of the ramp voltage can be as shown in formula (7):

$$V_{CHG} = \frac{I_{CHG} \times t_{CHG}}{C_{CHG}} \quad (7)$$

Here, $V_{CHG}$ can represent the value of the ramp voltage, $I_{CHG}$ can represent the value of the charging current, and $t_{CHG}$ can represent the charging time. As shown in FIG. 3, the charging time may last from a previous declining time to a later declining time of the drain-source voltage (e.g., from time $t_2$ to time $t_4$, or from time $t_7$ to time $t_9$). Correspondingly, in the resonant time interval of the drain-source voltage (e.g., from time $t_5$ to time $t_6$), since the drain-source voltage is relatively small, and lasts for a relatively short time, the peak value of the ramp voltage is relatively small. In the time interval from time $t_7$ to time $t_9$ (including the conduction time of the primary-side power device, e.g., from time $t_8$ to time $t_9$), since the drain-source voltage is relatively large, the peak value of the ramp voltage may be relatively large.

Based on the principle of the above-described ramp voltage, if the conduction time of the primary-side power device is relatively short, the peak value of the primary-side current may be relatively small. If the synchronous rectifier is conducting at this peak value moment, negative current may be generated due to the minimum conduction time of the synchronous rectifier. In this case, such possible negative current can be avoided by using a parasitic diode of the synchronous rectifier to freewheeling instead of turning on the synchronous rectifier. The threshold voltage can be set or predetermined according to a minimum conduction time of the synchronous rectifier. When the ramp voltage is higher than the threshold voltage, the synchronous rectifier can be on, and such negative current can be avoided.

Therefore, formula (8) can be deduced from formula (6) correspondingly:

$$V_{out} \times T_{ON\_S\_min} = k \times I_{CHG} \times T_{ON\_P\_min} \quad (8)$$

Here, $T_{ON\_S\_min}$ can represent the minimum conduction time of the synchronous rectifier, and $T_{ON\_P\_min}$ can represent the minimum conduction time of the primary-side power device. According to charging and discharging principles of the capacitor, $$C \times \frac{du}{dt} = i,$$

formula (8) can be converted to:

$$V_{out} \times T_{ON\_S\_min} = C_{CHG} \times V_{th} \quad (9)$$

Here, $C_{CHG}$ can represent the capacitance value of the capacitor, and $V_{th}$ can represent the threshold voltage value. Based on the flyback switching power supply, threshold voltage $V_{th}$ can be in direct proportion to output voltage $V_{out}$ of the flyback switching power supply and the minimum conduction time $T_{ON\_S\_min}$ of the synchronous rectifier. Also, the threshold voltage may be in inverse proportion to capacitance value $C_{CHG}$ of the capacitor.

When the conduction time (e.g., from time $t_3$ to time $t_4$) of the primary-side power device is too short, shown as waveform 303, the peak value of ramp voltage $V_{ramp}$ can be less than threshold voltage $V_{th}$. Under this circumstance, the current can flow through the parasitic diode of the synchronous rectifier, and the synchronous rectifier may not be on. In this way, possible negative current which might otherwise occur under light load conditions can be avoided.

A synchronous rectifying control method in particular embodiments can represent value and state information (e.g., the resonant state or the conduction state of the primary-side power device) of the drain-source voltage through the peak value of the ramp voltage, which may be related to drain-source voltage $V_{DS}$ when the synchronous rectifier is turned off. The ramp voltage can be compared against the threshold voltage that may be determined by the circuit parameters of the isolated switching power supply under a conduction state. When the peak value of the ramp voltage reaches the threshold voltage and the drain-source voltage begins to decline, the synchronous rectifier can be turned on to achieve relatively fast conduction control of the synchronous rectifier. After a predetermined time, the ramp voltage may be decreased to zero to avoid timing chaos under the resonant stage, and to improve system reliability. In addition, by setting the threshold voltage that corresponds to the minimum conduction time of the synchronous rectifier, the synchronous rectifier may not be on when the conduction time of the primary-side power device is too short, thus avoiding possible negative current.

In applications where there is a relatively narrow variation range of the input voltage, a current that is in direct proportion to the drain-source voltage can also be used as the charging current for the capacitor. Minimum conduction time $T_{ON\_P\_min}$ of the primary-side power device can be configured as minimum shutdown time $T_{OFF\_S\_min}$ of the synchronous rectifier. In formulas (3) and (5), $V_{out} \times T_{OFF\_S\_min}$ can be configured as a DC bias voltage. In this case, the minimum shutdown time of the synchronous rectifier can be obtained by formula (10):

$$T_{OFF\_S\_min} = \frac{V_{out} \times T_{ON\_S\_min} \times N}{V_{in}} \quad (10)$$

Formula (6) can be converted to formula (11):

$$V_{out} \times T_{ON\_S\_min} = k \times I_{CHG} \times T_{OFF\_S\_min} - V_{out} \times T_{OFF\_S\_min} \quad (11)$$

Formula (11) can be represented as formula (12):

$$V_{out} \times T_{ON\_S\_min} = C_{CHG} \times V_{th} - V_{out} \times T_{OFF\_S\_min} \quad (12)$$

Therefore, threshold voltage $V_{th}$ can be obtained according to the minimum conduction time of the synchronous rectifier. In addition, topologies other than a flyback topology structure can also be utilized, and the threshold voltage can be set according to characteristics of the particular topology structure utilized.

In one embodiment, a synchronous rectifying control circuit configured for an isolated switching power supply, can include: (i) a voltage determiner configured to receive a power terminal voltage, where the power terminal voltage comprises a voltage between first and second power terminals of a synchronous rectifier in the isolated switching power supply, where the voltage determine is configured to activate a drop signal when the power terminal voltage starts to decline; (ii) a ramp voltage generator configured to generate a ramp voltage that continuously rises according to the power terminal voltage when the drop signal is inactive, where the ramp voltage generator is configured to reduce the ramp voltage in response to the drop signal being activated; and (iii) a conduction signal generator configured to receive the ramp voltage, the drop signal, and a threshold voltage, where the threshold voltage substantially matches a minimum conduction time of the synchronous rectifier, and where the conduction signal generator is configured to generate a conduction signal to turn on the synchronous rectifier when the ramp voltage is higher than the threshold voltage and the drop signal is activated.

Figure 4:
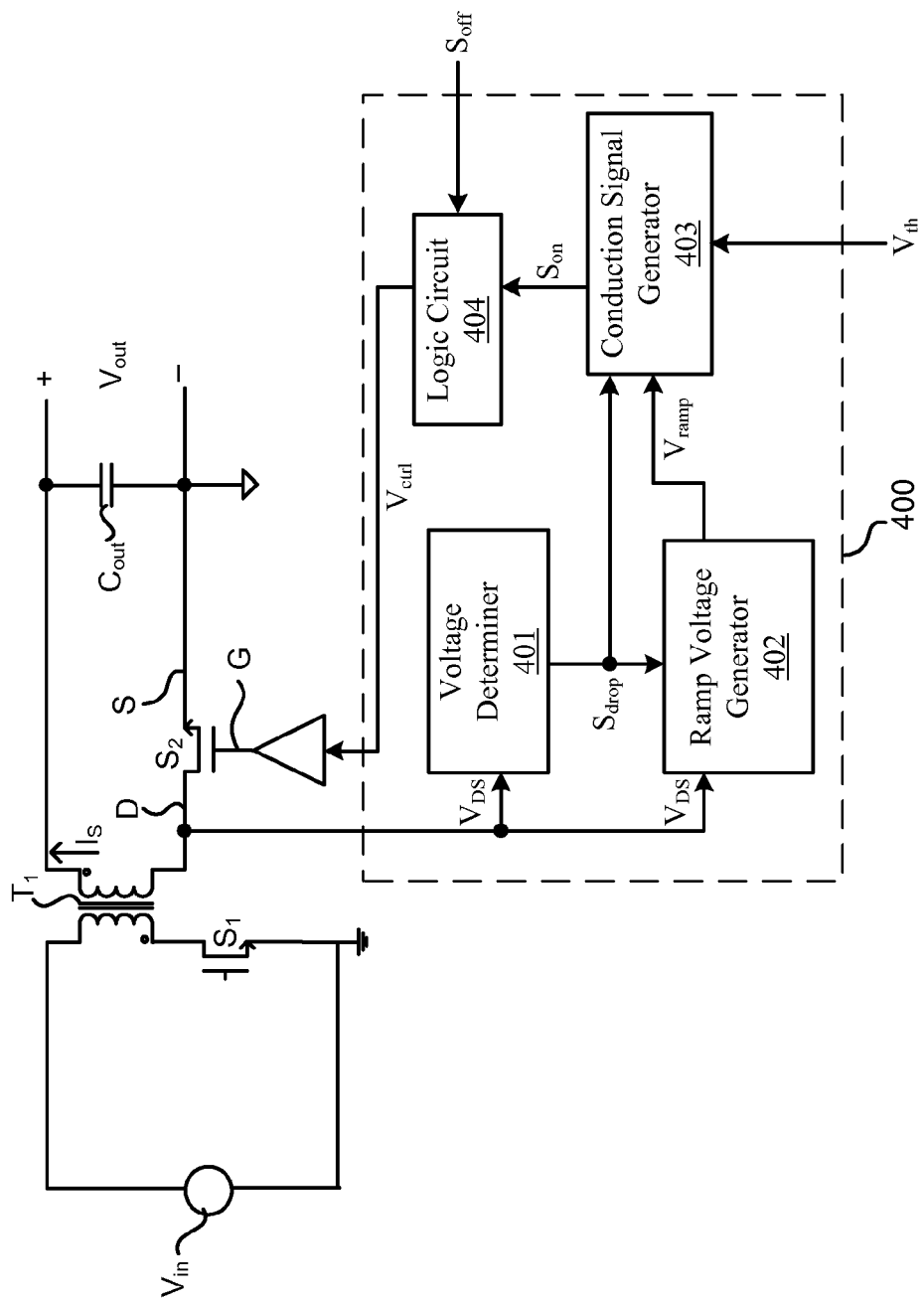
FIG. 4 is a schematic block diagram of an example synchronous rectifying control circuit in accordance with embodiments of the present invention.

Referring now to FIG. 4, shown is a schematic diagram of an example synchronous rectifying control circuit for an isolated switching power supply, in accordance with embodiments of the present invention. In this particular example, synchronous rectifying control circuit 400 can include voltage determiner 401, ramp voltage generator 402, and conduction signal generator 403. Also, the synchronous rectifier can be implemented as NMOS transistor $S_2$. Voltage determiner 401 can receive drain-source voltage $V_{DS}$ (the voltage between the first and second power terminals of the synchronous rectifier, or the power terminal voltage), and determine a variation trend of drain-source voltage $V_{DS}$. When the drain-source voltage $V_{DS}$ begins to decline, drop signal $S_{drop}$ can be activated, or generated as a one-shot pulse.

Ramp voltage generating circuit 402 can receive drain-source voltage $V_{DS}$ and drop signal $S_{drop}$, to generate ramp voltage $V_{ramp}$, which can continue to rise according to drain-source voltage $V_{DS}$. The peak value of ramp voltage $V_{ramp}$ may be in direct proportion to drain-source voltage $V_{DS}$ and the rising time. When drop signal $S_{drop}$ is active, ramp voltage $V_{ramp}$ may drop to zero. Conduction signal generator 403 can receive ramp voltage $V_{ramp}$, threshold voltage $V_{th}$, and drop signal $S_{drop}$.

When ramp voltage $V_{ramp}$ is less than threshold voltage $V_{th}$ and drain-source voltage $V_{DS}$ begins to decline, drop signal $S_{drop}$ can be active, and ramp voltage $V_{ramp}$ can drop to zero. However, when ramp voltage $V_{ramp}$ is higher than threshold voltage $V_{th}$ and drop signal $S_{drop}$ is active, the output signal of conduction signal generator 403 can be configured as conduction signal $S_{on}$. Also, threshold voltage $V_{th}$ can be set according to the topology structure and circuit parameters of the isolated switching power supply. Further, operating principles and waveforms diagram can be similar to the above description for FIG. 3.

Synchronous rectifying control circuit 400 of FIG. 4 can also include logic circuit 404. Logic circuit 404 can receive conduction signal $S_{on}$ and shutdown signal $S_{off}$, to generate control signal $V_{ctrl}$ to control the operating state of the synchronous rectifier. When conduction signal $S_{on}$ is active, control signal $V_{ctrl}$ can control the synchronous rectifier to conduct. After a certain or predetermined conduction time, shutdown signal $S_{off}$ can go active, and control signal $V_{ctrl}$ can be used to turn off the synchronous rectifier. The shutdown signal of the synchronous rectifier can be obtained by any appropriate shutdown signal control method. For example, when the drain-source voltage goes positive, or current begins to flow from drain to source, shutdown signal $S_{off}$ can be activated.

Figure 5:
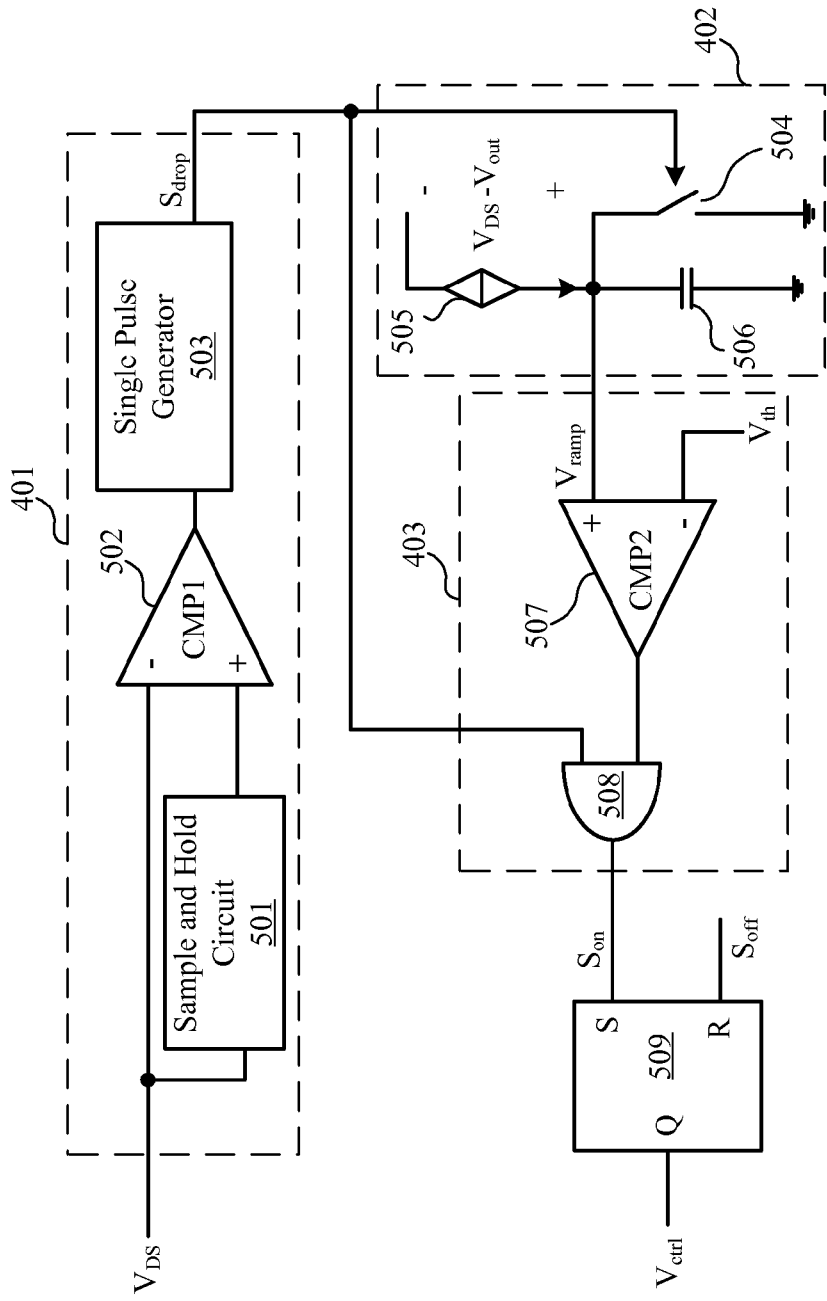
FIG. 5 is a schematic block diagram of another example synchronous rectifying control circuit in accordance with embodiments of the present invention.

Referring now to FIG. 5, shown is a schematic diagram of an example synchronous rectifying control circuit for an isolated switching power supply, in accordance with embodiments of the present invention. In this particular example, shown are specific examples of the voltage determiner or judgment circuit, the ramp voltage generator, the conduction signal generator, and the logic circuit of the synchronous rectifying control circuit.

For example, voltage determiner 401 can include sample and hold circuit 501, comparator 502, and single pulse generator 503. An input terminal of sample and hold circuit 501 can receive drain-source voltage $V_{DS}$ (the voltage between the first and second power terminals of the synchronous rectifier, or the power terminal voltage), and the output terminal can connect to a positive input terminal of comparator 502. The negative input terminal of comparator 502 can receive drain-source voltage $V_{DS}$, and the output terminal of comparator 502 can connect to the input terminal of single pulse generator 503.

The ramp voltage generator can include series connected voltage-controlled current source 505 and capacitor 506, and switch 504, which may connect parallel with capacitor 506. Voltage-controlled current source 505 can receive a difference between drain-source voltage $V_{DS}$ and output voltage $V_{out}$, and may generate a charging current that is in direct proportion to the difference. The voltage on a common node of voltage controlled current source 505 and capacitor 506 can be configured as ramp voltage $V_{ramp}$. The switching state of switch 504 can be controlled by the output signal of voltage determiner 401, drop signal $S_{drop}$.

Conduction signal generator 403 can include comparator 507 and AND-gate 508. A positive input terminal of comparator 507 can connect to a common node of voltage-controlled current source 505 and capacitor 506, to receive ramp voltage $V_{ramp}$. A negative input terminal of comparator 507 can receive threshold voltage $V_{th}$. Also, AND-gate 508 can receive the output signal of voltage determiner 401, and the output signal of comparator 507.

During operation, after the synchronous rectifier is turned off, in the rising stage of drain-source voltage $V_{DS}$, the output signal of sample and hold circuit 501 may be smaller than real-time drain-source voltage $V_{DS}$, and the output signal of comparator 502 can be low. Switch 504 may remain in and off state. Voltage-controlled current source 505 may continuously charge capacitor 506. In addition, voltage $V_{ramp}$ on the common node of voltage-controlled current source 505 and capacitor 506 may continue to rise.

When ramp voltage $V_{ramp}$ is less than threshold voltage $V_{th}$, the output signal of comparator 507 can be low, and the synchronous rectifier can remain in an off state. When drain-source voltage $V_{DS}$ begins to decline, the output signal of sample and hold circuit 501 can be higher than real-time drain-source voltage $V_{DS}$, and the output signal of comparator 502 may go higher. At this moment, single pulse signal generator 503 can receive the output signal of comparator 502, to generate single pulse drop signal $S_{drop}$ to turn on switch 504, and ramp voltage $V_{ramp}$ may rapidly drop to zero.

When ramp voltage $V_{ramp}$ is higher than threshold voltage $V_{th}$ and drop signal $S_{drop}$ is active, the output signal of comparator 507 may go higher to turn on the synchronous rectifier. For example, logic circuit 404 can include RS flip-flop 509 having set terminal S to receive the output signal of AND-gate 508 ($S_{on}$), reset terminal R to receive the shutdown signal ($S_{off}$), and output terminal Q to output control signal $V_{ctrl}$ for the synchronous rectifier.

The synchronous rectifier can be implemented by any suitable type of power device (e.g., an NMOS transistor, a PMOS transistor, a BJT, etc.). Also, various topologies of the switching power supply (e.g., flyback, forward, push-pull, half-bridge, full-bridge, etc.) can also be employed in particular embodiments. The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A synchronous rectifying control method for an isolated switching power supply, the method comprising:
    a) generating a ramp voltage comprising generating a charging current corresponding to a power terminal voltage and using said charging current to charge a capacitor, wherein said power terminal voltage comprises a voltage between first and second power terminals of a synchronous rectifier in said isolated switching power supply, wherein a voltage across said capacitor is configured as said ramp voltage, and wherein said charging current is in direct proportion to a difference between said power terminal voltage and an output voltage of said isolated switching power supply;
    b) determining whether said power terminal voltage starts declining, wherein said ramp voltage continues to rise when said power terminal voltage is rising;
    c) comparing said ramp voltage to a threshold voltage when said power terminal voltage starts to decline, wherein said threshold voltage is in direct proportion to said output voltage of said isolated switching power supply and a minimum conduction time of said synchronous rectifier, and in inverse proportion to a capacitance value of said capacitor;
    d) reducing said ramp voltage and controlling said synchronous rectifier in an off state when said ramp voltage is lower than said threshold voltage; and
    e) reducing said ramp voltage and controlling said synchronous rectifier in on state when said ramp voltage is higher than said threshold voltage.

2. The method of claim 1, further comprising:
    a) activating a drop signal with a fixed time when said power terminal voltage is detected to decline; and
    b) using said drop signal to control said capacitor to discharge, wherein said ramp voltage drops to zero in response to said drop signal being activated.

3. The method of claim 1, wherein said charging current is in direct proportion to said power terminal voltage.

4. The method of claim 1, wherein said determining whether said power terminal voltage starts declining comprises:
    a) sampling and holding said power terminal voltage; and
    b) determining said power terminal voltage is declining when said power terminal voltage obtained by said holding is higher than said power terminal voltage obtained by said sampling.

5. The method of claim 1, further comprising turning off said synchronous rectifier using a shutdown signal after said synchronous rectifier has been on for a predetermined time.

6. A synchronous rectifying control circuit configured for an isolated switching power supply, said synchronous rectifying control circuit comprising:
    a) a voltage determiner configured to receive a power terminal voltage, wherein said power terminal voltage comprises a voltage between first and second power terminals of a synchronous rectifier in said isolated switching power supply, wherein said voltage determiner comprises a sample and hold circuit configured to receive said power terminal voltage, and to generate a sample and hold output, a first comparator configured to receive said sample and hold output and said power terminal voltage, and to activate a first comparator output when said power terminal voltage begins to decline, and a single pulse generator configured to activate a drop signal in response to said first comparator output;
    b) a ramp voltage generator configured to generate a ramp voltage that continuously rises according to said power terminal voltage when said drop signal is inactive, wherein said ramp voltage generator is configured to reduce said ramp voltage in response to said drop signal being activated; and
    c) a conduction signal generator configured to receive said ramp voltage, said drop signal, and a threshold voltage, wherein said threshold voltage substantially matches a minimum conduction time of said synchronous rectifier, and wherein said conduction signal generator is configured to generate a conduction signal to turn on said synchronous rectifier when said ramp voltage is higher than said threshold voltage and said drop signal is activated.

7. The synchronous rectifying control circuit of claim 6, further comprising a logic circuit configured to receive said conduction signal and a shutdown signal, and to generate a control signal to control an operating state of said synchronous rectifier.

8. The synchronous rectifying control circuit of claim 6, wherein said ramp voltage generating circuit comprises:
   a) a current generation circuit configured to generate a charging current based on said power terminal voltage;
   b) a capacitor coupled to said current generation circuit, wherein a voltage across said capacitor is configured as said ramp voltage;
   c) a control switch coupled in parallel with said capacitor, wherein a state of said control switch is controlled by said drop signal;
   d) wherein said control switch is in an off state, said charging current charges capacitor, and said ramp voltage continues to rise, when said power terminal voltage is not declining; and
   e) wherein said control switch is in an on state, and said ramp voltage drops to zero, when said power terminal voltage begins to decline.

9. The synchronous rectifying control circuit of claim 8, wherein said charging current is in direct proportion to said power terminal voltage.

10. The synchronous rectifying control circuit of claim 8, wherein said charging current is in direct proportion to a difference between said power terminal voltage and an output voltage of said isolated switching power supply.

11. The synchronous rectifying control circuit of claim 10, wherein said threshold voltage is in direct proportion to said output voltage of said isolated switching power supply and said minimum conduction time of said synchronous rectifier, and wherein said threshold voltage is in inverse proportion to a capacitance value of said capacitor.

12. The synchronous rectifying control circuit of claim 6, wherein said conduction signal generator comprises:
   a) a second comparator configured to receive said ramp voltage and said threshold voltage, and to generate a second comparator output; and
   b) an AND-gate configured to receive said drop signal and said second comparator output, and to generate said conduction signal.

* * * * *